Patented Oct. 10, 1939

2,176,025

UNITED STATES PATENT OFFICE 2,176,025

STABILIZATION OF ORGANIC MATERIALS

Sidney Musher, New York, N. Y., assignor to Musher Foundation Incorporated, New York. N. Y., a corporation of New York No Drawing. Application October 24, 1938. Serial No. 236,788

13 Claims. (Cl. 149—1)

The present invention relates to the stabilization and preservation of various organic materials, such as hides, skins, bones, fish, meat, fruit, vegetables, cheese, etc., to retard deterioration thereof and particularly to retard the development of rancidity and putrefaction therein.

It has been found that cereal flours when dusted upon these organic products give protection thereto against development of rancidity and putrefaction. In the presence of salt or sodium chloride and other salts, such as sodium nitrate and sodium nitrite, which are used for treating these materials, special problems are presented due to the tendency of salt to promote rancidity.

Among the objects of the present invention is to provide improved methods and compositions for stabilizing various organic materials, such as hides, skins, bones, fish, meat, fruit, vegetables, cheese, etc., and particularly for providing treated products which will have much higher stability from the standpoint of development of rancidity or putrefaction.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing these objects it has been found surprisingly that if the organic material is subjected to only a limited treatment with the cereal flours or similar materials in the presence of salt or of the brine, that a much higher stability and a much better stabilized product is obtained than if the creal flour or other material be permitted to remain in contact during a prolonged treatment. Preferably the initial part of the treatment with the salt or similar product takes place in the presence of the cereal flour while the subsequent treatment is carried out after the creal flour is removed.

The creal and grain flours are utilized preferably in their finely divided, raw, and unbleached condition, and include such cereals as oats, barley, corn, wheat, rice, rye, hominy, tapioca, etc.

These cereals may be admixed with salt and the mixture may then be applied to the surface of the materials requiring stabilization or the materials may be suspended in a brine bath, containing the finely divided cereal materials in suspension, and then removed after a relatively short treatment, the curing treatment being continued following the removal of the cereal, whereby a substantially stabilized product is obtained. The subsequent curing or salting treatment after the cereal has been removed is usually much more prolonged than the initial curing or salting treatment with the cereal present.

It is found that when the combined salt and cereal flour curing or salting treatment is discontinued after, for example, from 5 seconds to several days, followed by removal of the cereal flour and then followed where desired with the treatment with salt alone in dry condition or in solution, the product will be resistant to rancidity and putrefactive action for very long periods such as up to a year in many cases.

Organic products such as skins and hides used in the manufacture of leather may be treated in accordance with this invention.

Example I

A hide was divided into two parts. One part was placed in an 85° salinometer salt brine to which had been aded 10% by weight of pulverized oats. The other part was placed in the same brine but without the oats being present. After a pickling period of 12 hours, the hide present in the oat brine was removed and placed in brine free of oats. Both parts were then kept in brine free of oats for 30 days. The hides were examined after 30 days and it was observed that the hide which had initially been treated with the salt oats combination showed a better color and was considerably more free of objectionable odor than the hide which had been treated in brine only.

Wherever hides are normally subjected to a salting or brining operation, the cereal flour may be utilized during the intial salting period and subsequently removed, allowing the remainder of the brining operation to be continued in salt only, under which conditions a marked improvement in the keeping quality of the hides or other leather product will be obtained.

Where the leather material is subjected to an oil or fat treatment or where it is particularly fatty in character, the utilization of the cereal flour along with the salt in a brining treatment for a short period of time will materially improve the keeping quality of the hide or leather product for long periods following such treatment.

In a similar manner, other skins such as the skin portion of furs, bones, and similar products may be treated. Hog bungs, as a different type of organic material, may in a similar manner be treated.

Example II

Hog bungs were taken from a uniform type of hog and were divided into two parts, half being packed in dry salt and the other half in a mixture comprising 85% of dry salt and 15% of finely divided, dry milled maize flour. After 24 hours at room temperature the bungs were removed, thoroughly washed, and placed in a container with salt only. This was done both in the case of the bungs that had been packed with salt only and with the salt maize mixture.

After a period of three months, the bungs were removed and soaked in water for 24 hours. The bungs were then removed from the water bath, dried at 120° F. for 12 hours, and examined. The bungs which had received the short salt maize treatment at the early part of the salting operation were white in color and had no objectionable odor. The bungs which had been treated with salt only were yellow and the surface fat portion was distinctly oxidized and at the same time the bungs gave a slight but noticeable putrid odor.

The cereals may be employed in the textile industry and particularly in connection with textile yarns and fabrics where salting is normally employed and where the cereal flours may be used during the time of the initial salting treatment. When used in this manner, the cereals show up markedly in retarding rancidity of sulphonated oils, soaps, and other fatty materials used prior to that treatment or subsequently thereto.

When a fatty fish product such as mackerel is dusted with oat flour and salt, and the combination of oat flour and salt is held on the surface of the mackerel as a dust or coating, an improvement in the keeping quality of the mackerel will be obtained. When, however, the salt oat flour combination is applied to the mackerel and after a short period of from 2 hours to 30 days, for example, is removed and replaced with salt without the addition of any oat flour, it has surprisingly been found that a much more marked improvement in keeping quality is observed.

Example III

Mackerel fillets were prepared in a brine containing 20% salt and 15% of oat flour. In one case the fillets were held at room temperature for three months, observations being taken on the quality of the fish monthly. In another case, the oat flour salt combination was removed at the end of one week, and there was added salt alone in the same 20% concentration. In a third case, the mackerel fillets were held in salt only. The following results were obtained:

|  | At end of— | | |
| --- | --- | --- | --- |
|  | 1 month | 2 months | 3 months |
| Mackerel held in salt only. | Slightly rancid. | Rancid. | Badly rancid and putrid. |
| Mackerel treated with salt and oat flour and not repacked. | Good. | Slightly rancid. | Rancid, slightly decomposed, sour. |
| Mackerel treated with salt and oat flour which was removed after one week and repacked with salt only. | Good. | Good. | Slightly rancid, no putrefaction. |

It is evident that the treatment with oat flour without repacking is not nearly as satisfactory as the treatment where the oat flour is removed after a short contacting period.

A particular advantage obtained by removing the floured material after a relatively short treatment arises from the fact that such flours often tend to deteriorate or become sour upon standing, particularly in brine baths, and the washing away of the excess of cereal or other flour immediately upon the completion of the limited treatment is most advantageous. Furthermore, the inhibiting action in respect to rancidity and putrefaction seems to be given to the organic product in greater strength as a result of the very limited contact than would be obtained if there was a prolonged contact over a long period of time.

The amount of salt to be used in connection with the stabilizing floured material may vary from equal quantities with the flour to 100 times the weight of the flour. The amount of salt to be employed will depend upon the extent of salting that is required or desired, and also the quality, size, and type of material to be stabilized.

The stabilizing material in the form of the cereal flour does not in any way change the normal characteristics of the treated organic product immediately following treatment. There is no coagulation of the protein or other action which would tend to prevent penetration of air or other oxidizing material, or release of the juices of the organic product. On the contrary, it appears as if the use of the cereal tends to promote penetration.

Example IV

Sardines were dipped into a 15% salt solution containing 5% of pulverized oats. They were held in this solution for 4 hours, then removed and washed off so that they were clean of any surface salt and oats. They were then canned in the normal manner. Another lot of sardines was prepared under the same conditions except that no pulverized oats was used, salt only having been employed. After salting in each case, the sardines were dried at 98° F. for 12 hours and then packed in cans containing a small quantity of cottonseed oil.

Immediately after canning the sardines were examined for both rancidity and protein decomposition and it was evident that the sardines which had been originally treated with a small percentage of pulverized oats in the salt for the 4 hour period and then freed of oats were free of rancidity and showed much less signs of protein decomposition than did the sardines treated with salt only, where rancidity and "fishiness" were evident. At the end of a 6 month period the same sardines were examined and the untreated sardines were found to be definitely rancid and objectionable whereas the sardines which had been treated showed only a slight degree of "fishiness" indicative of the beginning of rancidity.

With the salt may also be included sodium nitrate or sodium nitrite, as the case may be.

Example V

Corned beef was rubbed with sodium nitrate and a mixture made up of 98.5% salt and 1.5% finely ground oat flour. At the close of a 7 day period the corned beef was removed, thoroughly washed, and placed in storage at 45° F. A similar sample of corned beef was rubbed with sodium nitrate and salt, but without any oat flour, and removed after 7 days in the same way.

At the close of a 2 week period the corned beef which had been prepared with the original oat flour treatment showed no sign of rancidity and it had a much more red and desirable color than did the corned beef prepared without the oat flour. The corned beef which had been prepared without oat flour was rancid and objectionable in taste.

Of distinct advantage in the utilization of this process is that there is no apparent change in the outer structure or protein of the meat, fishery, or other product that is treated. There will be no tendency for the surface of the product that is treated according to the present invention to coagulate or to change its chemical structure in any manner.

Another distinct advantage in the use of this process is the protection afforded to animal products against discoloration, evidenced not only by the rusting or browning of the oils resulting from development of rancidity, but also by oxidation of the haemoglobin to methaemoglobin as in the blackening of meat, etc.

*Example VI*

A fresh cut of beef steak was immersed for 5 seconds in water containing 3% of maize flour and 3% of salt. The next cut was immersed for 5 seconds in plain water containing only 3% salt. Both cuts were immediately thereafter immersed in plain water for 5 seconds and then exposed to the air. After 30 minutes, the cut which had not been treated with maize flour showed a definite blackening, whereas the treated cut retained most of its original redness. Similar observations were made after 1 hour and 1½ hours.

A surprising effect of the present treatment resides in the fact that although salt usually tends to enhance or increase rancidity of the organic product while retarding putrefaction, nevertheless with the combination of the salt and the cereal flour or other similar flour, this rancidity causing behavior of the salt is altogether reversed with the result that after a relatively short treatment with the combination of the salt and cereal flour, the organic product is much more resistant to both rancidity and putrefaction than formerly. Furthermore, after removal of the oat or other cereal flour, the organic product retains its inhibiting action for long periods of time even though the final treatment be prolonged for anywhere from 10 to 100 times the length of time that the product is treated with the combination.

Oat flour may be used with salt in either dry form so that a pickle is produced with the product with which it is employed, or it may be added to brine already prepared. In addition to using the cereals and grains described above, there may be employed, although less preferred, flour material of the oil seed type and particularly of those oil seeds that are de-oiled to an oil content of less than 10%, such as cottonseed press cake ground to a flour, sesame seed press cake ground to a flour, peanut press cake ground to a flour, etc.

The presence of any excess oil or fat-like body militates against producing favorable results. Rancidity is rapidly induced when the free oil comes in contact with the salt; the oily material is not miscible with the water of the brine; and wherever the oily material contacts the organic product it may not be removed, but contaminates the treated product and thereby the rate of improvement in keeping quality is materially reduced.

*Example VII*

A mackerel was split into two halves. One half was immersed into a 15% salt brine containing 3% of crushed peanuts containing 55% oil, most of which oil was free. The other half was immersed into a 15% salt brine containing 3 of peanut flour after de-oiling so that the oil content was under 10%. The mackerel was held in the solution in each case for 3 hours, agitating the brine constantly. Then the fillets were removed and immersed into plain water. The fillet treated with the de-oiled peanut flour was substantially free of discoloration and kept approximately twice as long as the fillet which was treated with the crushed peanuts and which fillet was oily and messy in appearance and could not be freed of its objectionable oily characteristics.

In addition to the treatment of animal products, this process may be applied to other materials such as to fruits in combination with brine containing cereals or de-oiled seed flours.

*Example VIII*

Sliced peaches were dipped—
A. Into a 5% salt brine for 2 hours, then removed, washed, and repacked in fresh water;
B. Into a 5% salt brine containing 2% oat flour for 2 hours, then removed, washed, and repacked in plain water containing 2% oat flour;
C. Into a 5% salt brine containing 2% oat flour for 2 hours, then removed, washed, and repacked in plain water.

The peaches were observed after 48 hours. The greatest discoloration occurred in the peaches which had not been treated with oat flour. The least amount of discoloration occurred in the peaches which were initially treated with oat flour and which after the 2 hour period were repacked in fresh water. Those peaches which remained in the oat flour water solution, although better than the untreated, were more discolored than the peaches packed in accordance with C above and presented an objectionable appearance from the standpoint of the discoloration due to the presence of the flour.

The addition of salt and cereal flour in connection with fruits as above suggested also appears to retard deteriorating enzymatic activity and this retardation is greater than when there is only a limited treatment with the combination of flour and salt followed by the prolonged treatment without the flour and with the flour removed as by washing.

Pears, apples, plums, cherries, oranges, etc., may similarly be treated with brine and flour combinations and the fruits subsequently canned, dried, or dehydrated, concentrated or otherwise processed without the flour being present.

Vegetables such as potatoes may similarly be treated.

*Example IX*

Sliced potatoes were dipped into—
A. 15% brine for 3 hours, then removed and fried in cottonseed oil at 275° F. until brown, then salted and packed in waxed glassine bags;
B. 15% brine containing 5% maize flour for 3 hours, then removed, fried, salted and packed as above;
C. 15% brine containing 5% maize flour for 1 hour, then removed, washed off in 15% brine, replaced in fresh 15% brine for 2 hours, then removed, fried, salted, and packed as above.

The potato chips were examined at regular intervals with the following results:

| | After 2 weeks | After 6 weeks | After 10 weeks |
|---|---|---|---|
| Samples A | Fresh | "Off" | Rancid. |
| Samples B | do | Slightly "off" | Slightly rancid. |
| Samples C | do | Fresh | Slightly "off." |

Other materials including those containing fats such as olives, which are normally subjected to a brining treatment may similarly be treated during the salting process.

Although salt is by far the most desirable material to use with the cereals or seed materials, there may also be employed, although less preferably, other agents including sodium nitrate and sodium nitrate. Sugar may also be employed with the stabilizer and, following a short contacting period, removed as in the case of salt. Raw sugar is to be preferred for this purpose, although refined sugar or syrup of cane, beet, corn, or other origin may also be employed.

It is desirable that the salt flour application be first made at the time of the first salting operation. Where, for example, an oat flour salt mixture is applied to an already salted fish, the rate of improvement is materially less than where the oat flour salt combination is used at the time of the first salting operation.

Example X

Mackerel fillets were put down—

A. In a concentrated salt solution for a period of 4 months;

B. In a concentrated salt solution containing 5% oat flour against the weight of the brine, for a period of 15 days; the fillets then removed and repacked in a concentrated salt solution free of oat flour for the balance of 3½ months;

C. In a concentrated salt solution for a period of 15 days; then the fillets removed and repacked in a concentrated brine containing 5% oat flour against the weight of the brine for a period of 15 days; then the fillets repacked again in a concentrated brine free of oat flour for a period of 3 months.

After a period of 4 months, the following observations were made:

*Fillets A.*—Badly rancid and signs of putrefaction;

*Fillets B.*—No rancidity and no sign of putrefaction;

*Fillets C.*—Slightly rancid and discolored; slight indication of putrefaction.

The surprising thing about this characteristic of the combination of cereal and other flours and salt in giving prolonged inhibiting action after limited contact is that it does not appear to be characteristic of other antioxidant materials such as crude oils, lecithin, and hydroquinone. Where these last-mentioned antioxidants are used for a limited period, the inhibiting action is apparently not retained by the fish or meat to any marked degree. Another unusual factor is that although salt tends to enhance or increase the rate of rancidity, nevertheless in the cereal combination as disclosed, the rancidity promoting effect is altogether overcome and negatived.

It is, of course, possible to use the salt either in dry form or in a brine and employed in any reasonable concentration such as from a 5% concentration to a saturated salt solution or using the dry salt alone.

It has been found that the cereal and seed flours may also be activated by heat or hydrolysis thereof before combination with the salt and applied to the organic product.

For example, soya flour may be immersed in water and refluxed at 212° F. for 15 minutes and then either converted into brine by the addition of salt, or dried to a powdery mass by removing the water, subsequently utilizing the activated soya flour with dry salt. This treatment materially improves the keeping quality of the soya flour itself and enhances the value of the soya flour as a means for retarding decomposition of animal products with which it may be utilized.

Moreover, in the case of these de-oiled seed flours and also in the case of the alcohol and water soluble extracts of the cereals, for example, when these materials are heated in the presence of a small amount of the animal product subject to decomposition, the inhibiting action will be increased by anywhere from 3 to 20 or 30 times. The heating operation may desirably be carried out at a temperature of 200° F. and very satisfactory activation is obtained at temperatures of from 350° F. to 450° F.

The different types of organic materials that may be treated in accordance with this invention include hides, skins, bones, textile yarns, meat and fishery products such as corned beef, chicken, pork, etc., fish livers, cheeses and particularly those which normally are subjected to a salting operation.

By the term "vegetative stabilizing agent" employed in the accompanying claims, there are included particularly the stabilizing cereals and cereal materials and also the stabilizing seeds and nuts and stabilizing materials contained therein.

The present application is a continuation in part of application, Serial No. 61,087 filed January 27, 1936.

Having described my invention, what I claim is:

1. A process of treating hides with salt which comprises first treating the hides with salt and a small amount of a cereal flour for a relatively short period of time, then removing the salt and cereal flour, and then again treating the hides with salt alone for a relatively long period.

2. A process of treating hides with salt which comprises first treating the hides with salt and a small amount of a cereal flour and then washing off the cereal flour.

3. In the two-step treatment of organic materials subject to deterioration with a saline material, the first step of carrying out the initial portion of the treatment for a relatively short period of time with a vegetative stabilizing agent added to the saline material and removing such stabilizing agent, then continuing the treatment with the saline material for a relatively long period of time after the stabilizing agent has been removed.

4. In the two-step treatment of organic materials subject to deterioration with a saline material, the first step of carrying out the initial portion of the treatment for a relatively short period of time with a stabilizing agent added to the saline material and removing such stabilizing agent, then continuing the treatment with the saline material for a relatively long period of time after the stabilizing agent has been removed, said stabilizing agent being selected from the group consisting of the cereal flours and flours of the de-oiled oil-containing seeds and nuts.

5. A process of protecting an organic product against deterioration which comprises immersing the product in a brine containing a small amount of a stabilizing agent derived from the group consisting of the cereals and seeds, and after a relatively short period, removing the organic product from contact with the stabilizing agent and then continuing the treatment with the brine for a relatively long period.

6. The method of retarding deterioration of organic products subject thereto which comprises treating said products with a salt and cereal flour combination for a relatively short period and subsequently removing the salt and cereal flour combination therefrom and then continuing treating the product with salt for a relatively long period.

7. A process of treating organic materials to render them resistant to deterioration upon standing and ageing which comprises treating said materials with a mixture of a concentrated salt material containing about 5% to 15% of finely divided, dry milled, unbleached cereal flour at room temperature, removing this mixture after about 1 hour to 15 days, washing the materials to remove the cereal and then keeping the materials in salt alone for a substantially longer period of about 30 days to 3 months.

8. A process of treating organic materials to render them resistant to deterioration upon standing and ageing which comprises placing said materials in a concentrated brine containing about 10% oat flour, removing the brine containing the oat flour after about 12 hours and then treating the materials in a brine for about 30 days.

9. A process of stabilizing a protein material against deterioration upon standing which comprises placing the protein material in salt brine containing a finely divided antioxygenic cereal material, permitting the salt brine containing the cereal materal to act upon the protein material for a relatively short period of time, washing the protein material to remove the brine and cereal material and then allowing the protein material to stand for a relatively long period.

10. A process of stabilizing protein materials against deterioration to retard development of rancidity and putrefaction which comprises treating such materials for a relatively short period of time with a combination of a relatively large amount of salt and a relatively small amount of finely divided, raw, unbleached cereal, and then removing the cereal and treating the protein material with salt after the removal of the cereal for a relatively long period.

11. A process of stabilizing protein materials against deterioration to retard development of rancidity and putrefaction which comprises treating such materials for a relatively short period with a combination of a relatively large amount of a saline material and a relatively small amount of anti-putrefactive and anti-rancidity stabilizing agent of vegetable origin, and then removing the stabilizing agent and saline material, and allowing the protein material to stand for a relatively long period free of the stabilizing agent, whereby said protein material is substantially stabilized against deterioration.

12. A process of stabilizing fatty fish against deterioration to retard development of rancidity and putrefaction which comprises treating such fish for a relatively short period with a combination of a relatively large amount of a saline material and a relatively small amount of anti-putrefactive and anti-rancidity stabilizing agent of vegetative origin, and then removing the stabilizing agent and saline material, and allowing the fatty fish to stand for a relatively long period free of the stabilizing agent, whereby said fatty fish is substantially stabilized against deterioration.

13. A process of stabilizing meat against deterioration upon standing which comprises treating the meat with a saline material containing a finely divided antioxygenic vegetative stabilizing agent, permitting the saline material containing the vegetative stabilizing agent to act upon the meat for a relatively short period of time, washing the meat to remove the saline material and vegetative stabilizing agent, and then allowing the meat to stand for a relatively long period.

SIDNEY MUSHER.